Oct. 20, 1925.　　　　　　　　　　　　　　　　　　1,557,974
J. A. BRADBURN
METHOD OF COMBINING SODA ASH AND WATER
Filed July 14, 1921
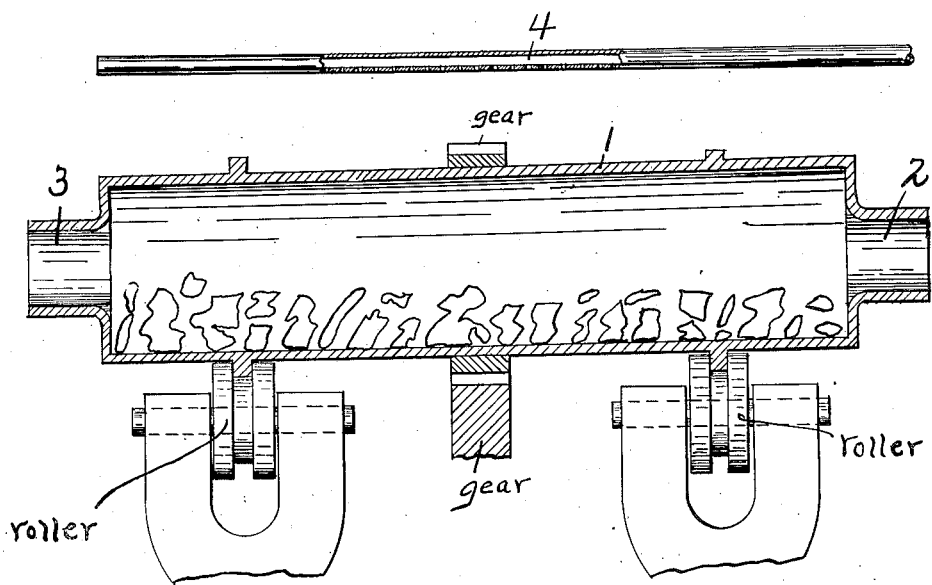

Patented Oct. 20, 1925.

1,557,974

UNITED STATES PATENT OFFICE.

JOSEPH A. BRADBURN, OF SYRACUSE, NEW YORK, ASSIGNOR TO NATIONAL CHEMICAL COMPANY, OF SYRACUSE, NEW YORK, A CORPORATION OF NEW YORK.

METHOD OF COMBINING SODA ASH AND WATER.

Application filed July 14, 1921. Serial No. 484,760.

*To all whom it may concern:*

Be it known that I, JOSEPH A. BRADBURN, of Syracuse, in the county of Onondaga, in the State of New York, have invented new and useful Improvements in Methods of Combining Soda Ash and Water, of which the following, taken in connection with the accompanying drawings, is a full, clear, and exact description.

This invention relates to a new process and apparatus for combining soda-ash and water to produce a powdered product.

Commercial soda-ash is substantially an anhydrous substance, and for certain purposes such as laundry use, it is desirable to combine with it as much water as possible while retaining the solid or powdered condition of the product, and this for the reason that when combined with water, the product dissolves more readily and without generating any material amount of heat.

I have discovered a process and apparatus whereby a powdered compound of soda ash and water can be efficiently and comparatively easily produced and I have demonstated the practicability of such process and apparatus.

In the drawings I have illustrated an apparatus suitable for my purpose.

My process consists in introducing soda ash and the desired percentage of water, as for instance, 10 to 50 per cent of water into one end of what may be termed a rotary ball mill comprising as shown, an inclined cylinder —1— having an inlet —2— at one end and a discharge or outlet —3— at the opposite end. The cylinder contains a quantity of balls or pieces of irregular shape and of hard substance, as for instance, iron or steel, which keep the soda ash and water while combining and hardening, from forming into a solid cake or pieces too large for the finished product and acts to thoroughly mix, break up and disintegrate the compound while passing through the apparatus so that it emerges or is discharged through the outlet in a powdered condition, the size of the particles of powder varying somewhat in accordance with the length and character of the treatment. This powder may be ground to finer particles, if desired.

The combination of soda ash and water generates a heat that is detrimental to the effective action of the process, and for this reason I have provided means for cooling the compound while passing through the apparatus. As illustrative of a suitable structure for this purpose, I have disclosed the pipe —4— disposed above the cylinder —1— and formed with a series of longitudinally extending spray openings through which water may be discharged upon the rotating cylinder —1— to maintain the same in cool condition and to keep the combined soda ash and water at a proper temperature to most effectively carry out the process.

By the term "powder" as used herein, I do not mean to limit myself to a product comprising particles of any particular size, as the size and character of the particles may vary in accordance with the length of time to which the soda ash and water is subjected to the action of the ball mill, and to the character and size of the balls or pieces of material placed therein which act to mix and break up the compound.

My process is clearly distinguished from the crystallization settling process of forming a chemical compound of soda ash and water which process requires days and sometimes weeks, in that my process by mechanical means effects such chemical combination in a relatively brief period and without loss of constituent elements.

Although I have shown and described an apparatus and process as illustrative of a perhaps preferred embodiment of my invention, I do not desire to limit myself to the details of construction of the apparatus or the details of the process, as various changes may be made in each without departing from the invention as set forth in the appended claim.

I claim:

The process of combining soda ash and water comprising introducing soda ash and water into one end of a container of substantially circular cross-section, causing a relative circular movement of said substances and the interior surface of the container, maintaining the combining substances in a broken up condition during such relative movement by constant contact with a plurality of comparatively heavy pieces of metal loosely carried within the container and movable with reference to both the combining substances and the container, cooling the combining substances during treatment, causing said combining substances to move from the inlet and toward the outlet end of said container, and discharging the combined substances at the outlet end of the container in the form of a powder.

In witness whereof I have hereunto set my hand this 29th day of June 1921.

JOSEPH A. BRADBURN.